April 25, 1933. C. P. HARDING ET AL 1,906,209
PIPE SUPPORT
Filed Feb. 23, 1929
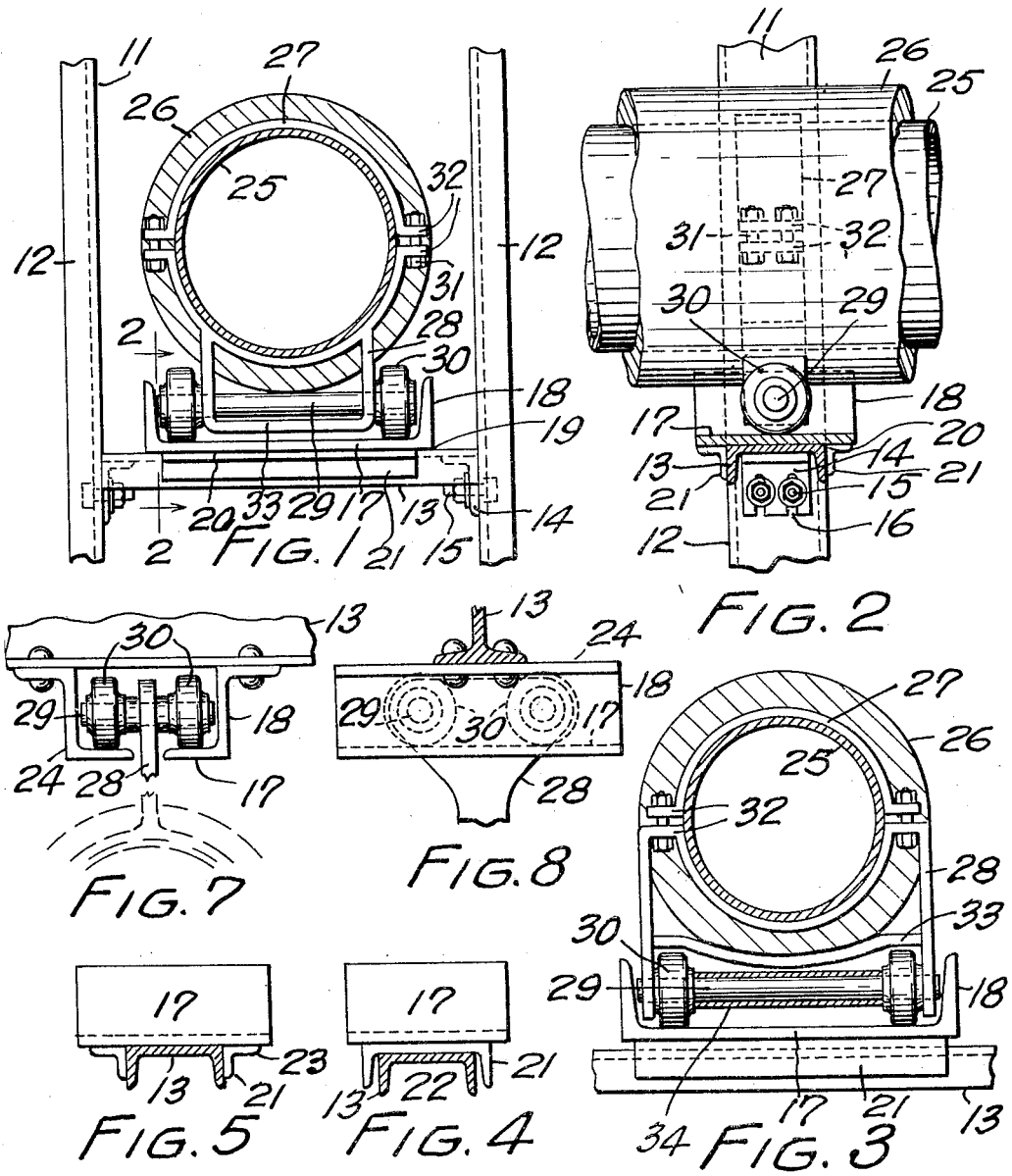
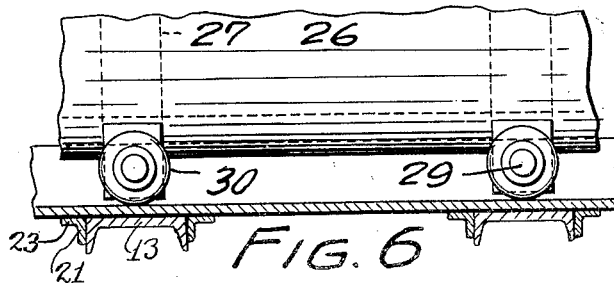
Inventors
Charles P. Harding
John A. Shaw
By
Attorney Patented Apr. 25, 1933

1,906,209

UNITED STATES PATENT OFFICE

CHARLES P. HARDING, OF MONTREAL, QUEBEC, AND JOHN A. SHAW, OF WESTMOUNT, QUEBEC, CANADA

PIPE SUPPORT

Application filed February 23, 1929. Serial No. 342,067.

This invention relates to improvements in pipe supports, and particularly supports for pipes of large size and pipes subjected to the greater than usual longitudinal expansion due to use of superheated steam, and the primary object of the invention is to provide supports which will permit free longitudinal movement of such pipes as they contract or expand with changes of temperature.

A further object is to provide a support so constructed that it may be connected directly and securely to the pipe without interfering with complete insulation of the pipe at the point of support.

A still further object is to provide a support capable of adjustment to permit of the pipe being properly aligned in installation.

Another object is to provide a support which may be easily and inexpensively constructed of standard materials in a number of embodiments.

Still another object is to provide a support particularly adapted for underground conduit work which will permit of the pipe and supports being retrieved from a conduit without excavation and which will serve as an indicator to show if water emerging from the conduit is leakage from the pipe or leakage into the conduit.

Various other objects and the advantages of the invention may be ascertained from the following description and the accompanying drawing.

Broadly, the invention resides in the provision, at each point of support of a pipe, of a carriage clamped directly and tightly to the pipe, including a loose axle and rollers travelling on a flanged track, the assembly of the axles and rollers to the carriage frame being maintained by the flanges of the track. The tracks are preferably initially adjustable to enable the pipe to be properly aligned and are eventually movable or immovable according to the requirements of the installation. The carriage is of such construction that the axles and rollers are entirely or substantially clear of any insulation on the pipe, so that the insulation may be unbroken at the points of support and at the same time not subjected to the weight of the pipe.

In the drawing which illustrates certain preferred embodiments of the invention and modifications thereof, but to which embodiments and details thereof the invention is not confined, as other embodiments are possible and numerous modifications may be made:—

Fig. 1 is a view showing an end elevation of one embodiment of the invention applied to support an insulated pipe from beneath, the pipe being illustrated in cross section.

Fig. 2 is a view showing a side elevation, partly in vertical section on the line 2—2 of Figure 1, of that embodiment of the invention shown in Figure 1.

Fig. 3 is a view similar to Figure 1, showing modifications thereof.

Fig. 4 is a view showing in side elevation the form of track support illustrated in Figure 3.

Fig. 5 is a view similar to Figure 4, showing a modified form of track support.

Fig. 6 is a fragmentary view similar to Figure 2 illustrating a further modification of the supporting track.

Figs. 7 and 8 are views illustrating, respectively, end and side elevations of another embodiment of the invention adapted for the support of pipes from above.

Referring more particularly to the drawing, 11 designates any suitable form of pipe support, which is illustrated as being a rack including uprights 12 and a shelf 13, all shown as of channel section but not necessarily so. Although only one rack shelf is shown carrying a single pipe, it will be understood that the rack may include any number of shelves and that each shelf may carry as many pipes as desired. It will also be understood that the form and construction of the rack may vary widely from that shown and that any other suitable form of support may be substituted. The shelf extends preferably horizontally between the uprights and is connected thereto by brackets 14 preferably rigidly secured to the under side of the shelf and initially adjustably secured to the uprights by bolts 15 passing through the uprights and through slots 16 in the brackets. When the position of the shelf is finally determined, the brackets may be rigidly fixed to the uprights by the bolts or by welding or riveting or any combination of these means.

A track 17 is mounted on the shelf 13 and is provided with upstanding flanges 18 at its edges. This track may take the form of a short length of channel as shown, or may be formed in two parts or rails, as suggested in Figure 7, or may be of any other suitable construction. The shelf extends transversely of the track and, in installation, the track may be moved along the shelf to proper position and then secured by spot welding anywhere along the junction of surfaces indicated at 19 or 20, as may be most convenient. Alternatively, the track may be designed to be permanently movable along the shelf or other support and, in such case, is provided on its under surface with depending flanges 21 between which the shelf is slidably engaged to hold the track against movement in its longitudinal direction while permitting movement in its transverse direction. These flanges 21 may be provided by fixing a short length of channel 22, as in Figure 4, or short lengths of angle bars 23, as in Figure 5, to the under side of the track, or may be provided in any other suitable way.

When the pipe is to be suspended, the track is preferably formed in two spaced parts or rails, as shown in Figure 7, but still exhibits the horizontal tread portion 17 with flanges 18 extending upwardly therefrom. The spacing between the two parts of the track depends upon the form of means used to suspend the pipe. It will be observed that by spacing the Z bars 24, or equivalent, forming the track of Figure 7 farther apart, the pipe carriage of Figure 1 may be accommodated in inverted position. Obviously, the track may be formed of sections other than those illustrated without departing from the feature of the upstanding flanges.

The track may be formed in short lengths, each supported by a single shelf, or equivalent, as shown in Figures 1 to 5, or may be continuous between supports, as shown in Figure 6, and it will be obvious that this applies equally to tracks above and below a pipe.

The pipe to be supported is designated 25 and its insulation 26.

Wherever it is desired to support the pipe, a carriage is provided comprising a hoop 27 clamped tightly around the pipe, arms 28 projecting from the hoop and carrying an axle 29 and rollers 30 on the axle. The hoops are preferably made in two or more parts connected in any suitable way, as by bolts 31 passing through ears 32 on the ends of the hoop parts. The arms 28 are rigidly connected to the hoop and project such distance beyond the insulation that the axle and rollers will be clear, or substantially clear, of the insulation. The arms may be connected by a transverse brace 33 which is preferably located at the free ends of the arms, as shown in Figure 1, but which may be located inwardly of the ends, as shown in Figure 3, the arms being long enough to make provision for the thickness of the brace between the axle and the insulation or the brace being bedded into the insulation. The arms are so located as to lie between the flanges 18 of the track when the carriage is in position thereon and the axle is of such length as to extend from flange to flange of the track and be thereby retained against displacement from the arms. The spacing of the arms may be materially less than the distance between the track flanges, so that the rollers may be accommodated between the arms and flanges, as shown in Figure 1. This is the normal and preferable condition and enables the width of the track to be less than or at most not materially greater than the outside diameter of the insulated pipe, thus permitting two or more pipes to be supported substantially in contact on a single shelf. Alternatively, if the pipe is extra heavy or if a wide base of support is desired, or if a relatively small pipe is to be supported on existing wide tracks, the modified form of carriage shown in Figure 3 may be used. In this form, the arms lie close to the track flanges and the rollers are located between the arms and held in spaced relation by a tubular spacer 34 on the axle. In this form the arms may spring from the free ends of the hoop ears, as shown, instead of from the body of the hoop, as shown in Figure 1.

Where the pipe is to be suspended from the tracks and the lateral stability of the two armed structures of Figures 1 and 3 is not necessary, a single arm may be used, as shown in Figures 7 and 8, the rollers being located between the arm and the flanges of the track but, as previously herein stated, the two armed carriage of Figure 1 may be used without change to suspend a pipe by appropriate spacing of the track parts or rails and inversion of the carriage. In the suspension type of support, the shelves may be beneath the tracks, as previously described, but are preferably above the tracks as shown in Figures 7 and 8.

Where the load on each carriage is great or where the extent or frequency of longitudinal movement of the pipe is such that the hoops would tend to rock and work loose on the pipe, the arm or arms of the carriage may be made of such width as to accommodate two or more axles spaced in the length of the pipe and each provided with rollers, as shown in Figure 8.

It will be understood that while the various details or features of construction have been shown in certain combination, the invention is in no way limited to these combinations and that the details may be otherwise combined in any new way desired.

The operation of the device is very simple and convenient. Considering an installation of the character shown in Figures 1 and 2, and assuming that the racks 11 have been set up at proper intervals with the tracks 17 on the shelves 13, the pipe is introduced length by length and the requisite number of carriage frames loosely clamped in place. The axles are pushed through the carriage arms and the rollers slipped on the ends of the axles. The completed carriage is now introduced into the track either by moving the carriage along the pipe or by lowering the pipe into place. When this part of the installing has been completed along the pipe, the pipe is aligned and in doing this the shelves may be adjusted vertically in the racks and the tracks may be moved along the shelves; also the carriages may be adjusted to proper position and the clamping bolts tightened. When the alignment is complete, the shelves are fixed in place by welding the brackets to the uprights, or by any other suitable means. The tracks may be fixed to the shelves by welding along the lines 19 or 20 or by any other means. If the tracks are provided with retaining flanges 21 engaging the shelves, the tracks may be left free to move along the shelves, and such freedom of movement is frequently desirable, for example, where the pipe lies in a curved path. The insulation is finally applied to the pipe and, because of the carriage construction, the pipe may be completely covered. The manner of assembling structures, as shown in Figures 3 and 7, will be apparent from the foregoing. When the pipe is installed in locations where it is accessible, only short lengths of track are necessary at each point of support. When the pipe is installed in an inaccessible location, as in a conduit, the track is preferably continuous through each section of the conduit, and the pipe with carriages complete and insulation may be thrust endwise into the conduit. Likewise, the pipe and carriages may be retrieved from the conduit by merely drawing it out at the end of the conduit, no excavation being necessary.

A great advantage of the invention is that the entire support may be easily and cheaply manufactured anywhere from easily procurable standard materials. No castings are involved except the rollers and no machining is required except drilling for axle and bolt holes. The support is compact and assembled in practically any location, thus enabling pipes to be installed in a minimum of space. As already emphasized, the carriages are connected directly and rigidly to the pipe and do not interfere with complete insulation of the pipe nor impose any mechanical stress on the insulation. The support afforded is not limited, except by the length of the track, to any amount of expansion and contraction. The carriages move freely on the tracks so that they will not tend to rock on the pipe and work loose themselves or loosen the insulation. The invention is applicable equally to pipes with screw or with flanged joints. The supports may be arranged to prevent or permit lateral movement of a pipe, as desired, also the same structure may be used to support a pipe either from above or from beneath. In conduit work the track forms a leakage indicator and enables withdrawal of pipe and carriages without excavation. Other advantages will be apparent to those skilled in the art to which the invention relates.

Having thus described our invention, what we claim is:—

1. A pipe support comprising a flanged track and a wheeled carriage adapted to travel on said track including a portion adapted to be clamped around a pipe, an axle passing through said portion and rollers on said axle, said axle and rollers being held in assembled relation to the clamped portion by engagement between the flanges of the track.

2. A pipe support comprising a flanged track and a wheeled carriage adapted to travel on said track including a hoop adapted to be clamped around a pipe, arms projecting from said hoop, an axle passing loosely through said arms and rollers loosely mounted on said axle, said axle and rollers being adapted to be held in assembled relation to the hoop and arms by engagement between the flanges of said track.

3. A pipe support comprising a flanged track and a wheeled carriage adapted to travel on said track including a hoop adapted to be clamped around a pipe, a projection from said hoop, an axle passing loosely through said projection, and rollers loosely mounted on said axle on opposite sides of said projection.

4. A device according to claim 3, in which the axle and rollers are adapted to be maintained in assembled relation to the projection by engagement between the flanges of the track.

5. A pipe support comprising a member to be disposed transversely of a pipe, means supporting said member for vertical adjustment, a flanged track to be disposed longitudinally of a pipe movably supported by said member, and means holding the track against movement in its longitudinal direction while permitting transverse movement thereof.

6. A pipe support comprising a primary support, a member, vertically adjustable upon said support adapted to be disposed transversely of a pipe, a flanged track to be disposed longitudinally of a pipe, movably supported by said member, and additional flanges on said track engaging said member and holding the track against movement in its longitudinal direction while permitting transverse movement thereof.

7. A pipe support comprising a pair of primary supports, a vertically adjustable member carried by said supports adapted to be disposed transversely of a pipe, a flanged track to be disposed longitudinally of a pipe, movably supported by said member, and additional flanges on said track engaging said member and holding the track against movement in its longitudinal direction while permitting transverse movement thereof, said track being rigidly attachable to said member.

8. A pipe support comprising a primary support, a member vertically adjustable upon said support adapted to be disposed transversely of a pipe, a flanged track to be disposed longitudinally of a pipe, movably supported by said member, and additional flanges on said track engaging said member and holding the track against movement in its longitudinal direction while permitting transverse movement thereof, and a wheeled carriage adapted to be rigidly secured to the pipe and adapted to travel on the track between the flanges thereof.

9. A pipe support for use in a conduit comprising a continuous track separate from the conduit to extend beneath a pipe and a plurality of wheeled carriages mounted on the pipe travelling on said track, said track being trough-shaped, thereby to retain a liquid leaking from the pipe and segregate same from liquid leaking into the conduit or from leakage from other pipes in the conduit.

10. A pipe support for use in a conduit comprising a track co-extensive with the pipe to be supported, primary supports, members vertically adjustable upon said supports extending transversely of and supporting the track, the track being laterally adjustable on said members, and a plurality of wheeled carriages adapted to be secured to the pipe and to travel on said track.

11. A pipe support comprising a flanged track and a wheeled carriage adapted to travel on said track including a hoop adapted to be clamped around a pipe, arms projecting from said hoop, an axle passing loosely through said arms and rollers loosely mounted on said axle between said arms, a sleeve loosely mounted on the axle between the rollers, said axle, rollers and sleeve being adapted to be held in assembled relation to the hoop and arms by location of the axle between the flanges of said track.

In witness whereof, we have hereunto set our hands.

CHARLES P. HARDING.
JOHN A. SHAW.